Jan. 16, 1934.  V. H. CHRISTEN  1,943,652

WINDSHIELD WIPER CLIP

Filed Dec. 28, 1932

INVENTOR
Victor H. Christen
BY
Barnes & Kisselle
ATTORNEYS

Patented Jan. 16, 1934

1,943,652

UNITED STATES PATENT OFFICE 1,943,652

WINDSHIELD WIPER CLIP

Victor H. Christen, Detroit, Mich.

Application December 28, 1932
Serial No. 649,183

4 Claims. (Cl. 15—250)

This invention relates to a windshield wiper clip and more particularly to a clip of improved design which can be used with different sorts of windshield wiper arms.

Prior to my invention many windshield wiper clips have been devised but most of these require a screw to hold the arm in place. It is one object of my invention to provide a clip which may be fixed to either a wire arm or an inverted channel-shaped arm without the use of a bolt or screw. Moreover, while there have been clips which have not required a screw, these have generally not provided any means for preventing the arm from slipping longitudinally relative to the clip even when secured in place. As a second object of my invention, therefore, I have prevented this clip from sliding longitudinally in a manner which will be fully described hereafter.

A further advantage of my invention lies in the fact that my clip may be constructed in a very simple manner by stamping a sheet of metal.

Figure 5:
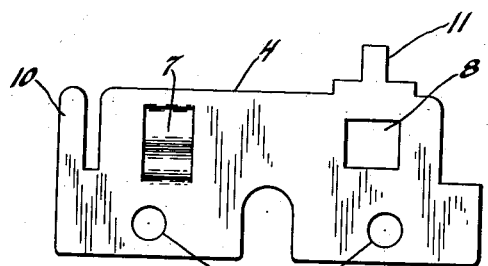
Fig. 5 is a view of my clip after it has been stamped.

Referring more particularly to the drawing, 1 represents a windshield wiper blade of the usual sort, in which strips of rubber 2 are secured in a channel-shaped stamping 3. As may be seen in Fig. 5 the clip is formed of one strip of metal 4 stamped out to provide the elements which will now be described. After the stamping operations the strip 4 is bent back upon itself to form two parallel side portions 5 and 6.

The struck-out portion 7 is formed in the side portion 5 approximately in the mid point of said side portion extending toward the other side portion 6 and partially fitting into the recess 8. A space 9 is thus formed in which a piece of wire, of the size generally used to form windshield wiper arms, may be inserted. The flange 10 is formed by simply cutting out a portion of the side 5 and is therefore in the same plane as that side portion. The upstanding flange 11 is formed as a portion of the side 6 and is bent inwardly as shown at 12 so that the main portion of the flange extends upwardly midway between the two sides.

Figure 1:
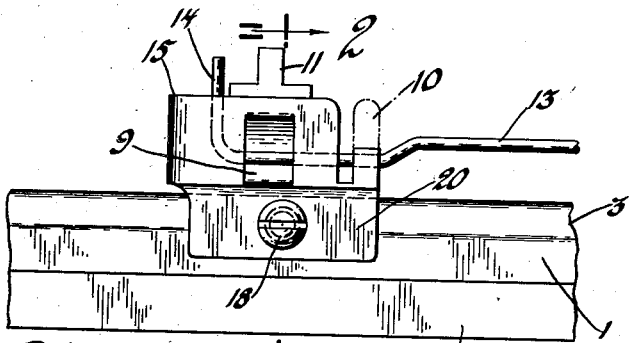
Fig. 1 is an elevation showing my clip fixed to a wire arm and a windshield wiper blade of the usual sort.
Figure 2:
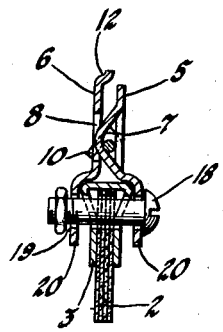
Fig. 2 is a section along the line 2—2 of Fig. 1.
Figure 3:
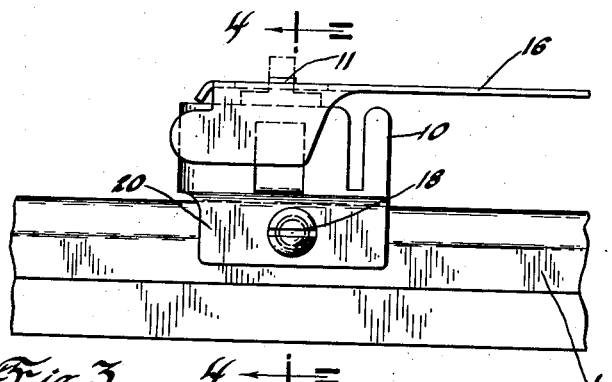
Fig. 3 is an elevation showing my clip fixed to an inverted channel-shaped arm.
Figure 4:
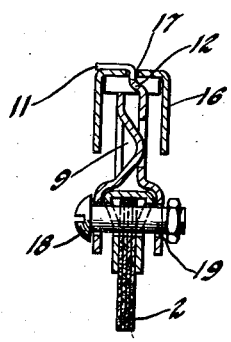
Fig. 4 is a section along the line 4—4 of Fig. 3.

When it is desired to secure the clip to a wire arm shown at 13 having an end 14 bent at right angles to the main portion, it is only necessary to insert the end of the arm through the space 9 and when the arm has been placed in the position shown in Fig. 1, the flange 10 is then bent over the arm thereby fixing the latter securely to the clip. The arm is prevented from moving longitudinally since the end 14 will bear against either the edge of the struck-out portion or the end 15 of the clip. An inverted channel-shaped arm 16 may be very easily secured to the clip by inserting the flange 11 in the longitudinal slot 17 in the upper surface of the arm and then bending over the flange as shown in Fig. 4. This arm is prevented from moving longitudinally by the flange 11 bearing against the ends of the slot 17.

My clip is secured to the windshield wiper blade by means of the bolt 18 which passes through the holes 19 in the downwardly extending flanges 20 of the clip, and the blade. The bolt 18 is threaded for only a short distance at its end with the result that the blade is permitted to pivot back and forth as the windshield wiper is moved from side to side, which permits the blade to be maintained at an acute angle with the windshield at all times.

It may thus be seen that I have devised a clip which may be very easily constructed and which will securely hold a great number of windshield wiper arms without permitting them to slip.

What I claim is:

1. A device for securing a windshield wiper blade to an arm having in combination a strip of metal bent back upon itself forming two side portions, one of said side portions having a struck-out portion and one of said side portions having a flange, two of the walls of said struck out portion being sheared from the side portion to form a pocket whereby a wire windshield wiper arm may be fixed to said strip when said arm is inserted in the pocket between said struck-out portion and side portion and said flange is bent over said arm, and means for pivotally securing said strip to a windshield wiper blade.

2. A device for securing a windshield wiper blade to an arm having in combination a strip of metal bent back upon itself forming spaced parallel side portions, one of said side portions having a struck-out portion disposed between said side portions and one of said side portions having a flange extending therefrom, two of the walls of said struck out portion being sheared from the side portion to form a pocket whereby a wire windshield wiper arm may be fixed to said strip when it is inserted in the pocket between said struck-out portion and side portion and said flange is bent over said arm, and means for pivotally securing said strip to a windshield wiper blade.

3. A device for securing a windshield wiper blade to an arm having in combination a strip of metal bent back upon itself forming two side portions, one of said side portions having an upstanding flange, whereby an inverted channel-shaped arm having a longitudinal slot in its upper surface may be fixed to said strip when said arm is placed over said side portions, said flange fitting into said slot, and said flange is bent downwardly adjacent to said arms, and means for pivotally securing said strip to a windshield wiper blade.

4. A device for securing a windshield wiper blade to an arm having in combination a strip of metal bent back upon itself forming two parallel side portions, one of said side portions having an upstanding flange, said flange being offset from said side portion so that it is positioned midway between said parallel side portions, whereby an inverted channel-shaped arm having a longitudinal slot in its upper surface may be fixed to said strip when said arm is placed over said side portions, said flange fitting into said slot, and said flange is bent downwardly adjacent to said arms, and means for pivotally securing said strip to a windshield wiper blade.

VICTOR H. CHRISTEN.